United States Patent [19]  [11] 4,346,044
Dhein et al.  [45] Aug. 24, 1982

[54] WATER-SOLUBLE AIR-DRYING ALKYD RESINS, PROCESS FOR THEIR PREPARATION AND THEIR USE AS BASES FOR NON-YELLOWING LACQUERS

[75] Inventors: Rolf Dhein; Jochen Schoeps; Rolf Küchenmeister, all of Krefeld, Fed. Rep. of Germany

[73] Assignee: Bayer Aktiengesellschaft, Leverkusen, Fed. Rep. of Germany

[21] Appl. No.: 167,558

[22] Filed: Jul. 11, 1980

[30] Foreign Application Priority Data

Jul. 28, 1979 [DE] Fed. Rep. of Germany ....... 2930734

[51] Int. Cl.$^3$ ................................................ C09D 3/64
[52] U.S. Cl. .................................. 260/404.8; 106/252; 106/263; 106/264; 524/596; 524/598
[58] Field of Search ................ 260/22 M, 22 R, 22 T, 260/404.8; 106/252, 263, 264

[56] References Cited

U.S. PATENT DOCUMENTS 3,055,869  9/1962  Wilson et al. ..................... 260/22 M
3,196,119  7/1965  Boller et al. ...................... 260/22 T
3,480,575  11/1969  Coats ................................. 260/22 R
3,883,454  5/1975  Dhein et al. ...................... 260/22 R
3,928,265  12/1975  Dhein et al. ...................... 260/22 R
4,042,547  8/1977  Kaiser et al. ..................... 260/22 R

FOREIGN PATENT DOCUMENTS 2742584  4/1979  Fed. Rep. of Germany .
1095953  12/1967  United Kingdom .
1499080  1/1978  United Kingdom .

OTHER PUBLICATIONS

Chemical Abstracts, vol. 90, No. 26, Jun. 25, 1979, p. 205926m.

Primary Examiner—Ronald W. Griffin
Attorney, Agent, or Firm—Connolly and Hutz

[57] ABSTRACT

Air-drying alkyd resins which are in the form of neutralized semi-esters of hexahydrophthalic acid anhydride constitute an excellent basis for coatings which undergo virtually no yellowing and which, even when aged by heat, show a high constancy of color.

12 Claims, No Drawings

WATER-SOLUBLE AIR-DRYING ALKYD RESINS, PROCESS FOR THEIR PREPARATION AND THEIR USE AS BASES FOR NON-YELLOWING LACQUERS

This invention relates to alkyd resins which contain residues of fatty acids with conjugated double bonds and in which the carboxyl groups are at least partially utilised, to a process for the preparation of these alkyd resins and to their use as bases for non-yellowing lacquers.

Aqueous stoving lacquers based on amine salts of semi-esters of fatty acid-modified alkyd resins containing hydroxyl groups are known (German Auslegeschrift No. 1,519,146). According to this Auslegeschrift, the water-insoluble alkyd resins are reacted with tetrahydrophthalic acid anhydride and the semi-esters thereby obtained are neutralised. The choice of tetrahydrophthalic acid anhydride is important for determining the degree of gloss which can be obtained, since, according to column 1, lines 53 to 59 of German Auslegeschrift No. 1,519,146, the reaction products obtained from phthalic acid anhydride, maleic acid anhydride, hexahydrophthalic acid anhydride, trimellitic acid anhydride or succinic acid anhydride give rise to lacquers which vary from matt to moderately glossy.

It is known that, in non-aqueous lacquer systems, the incorporation of unsaturated fatty acids containing conjugated double bonds results in good drying properties (German Offenlegungsschrift No. 2,742,584) although it is also known that amines promote the discolouration of lacquer coats based on lacquers which dry with oxidation (R. Dhein, Farbe und Lacke 84, 680–684 (1978)). Attempts to replace the amines by alkalies, however, result in considerably delayed drying (Paint Manufacture, Vol. 36, No. 5, page 49, May 1966).

It has now surprisingly been found that alkyd resins which contain condensed drying fatty acids with conjugated double bonds and which are in the form of semi-esters of hexahydrophthalic acid anhydride neutralised with ammonia or amines constitute an excellent basis for lacquers which undergo virtually no yellowing and which, even when aged by heat, show a constancy of colour virtually unknown in alkyd resins which have been neutralised with amines and modified with unsaturated fatty acids.

The term "amines" as used hereinafter also includes ammonia.

The present invention thus provides water-soluble, air-drying alkyd resins neutralised with amines and having fatty acid contents of from 20 to 60% obtained from dicarboxylic acids or their ester-forming derivatives, polyhydric alcohols, fatty acids, dicarboxylic acid anhydrides which form semiesters, and optionally monocarboxylic acids and/or monohydric alcohols, characterised in that from 10 to 80% by weight, preferably from 35 to 40% by weight, of the fatty acids are fatty acids with conjugated double bonds and that the semi-ester-forming dicarboxylic acid anhydride is hexahydrophthalic acid anhydride.

The term "water-soluble" as used in the context of this invention means that the alkyd resin does not precipitate in solvents consisting predominantly of water but forms a transparent or non-transparent "solution". The term "water-soluble" does not preclude the use of so-called solubilizing agents.

The fatty acid contents are calculated as triglycerides, based on the unneutralised alkyd resin semi-ester. The dimension in which it is calculated is percent by weight.

The term "alkyd resins" is used hereinafter to denote fatty acid-modified or oil-modified polyesters. The term "polyesters" means polycondensates prepared from alcohols and carboxylic acids as defined, for example, in Römpp's Chemielexikon, Vol. 1, page 202, publishers Frankh'sche Verlagsbuchhandlung, Stuttgart 1966, or as described by D. H. Solomon in The Chemistry of Organic Filmformers, pages 75–101, John Wiley & Sons, Inc., New York 1967.

The alcohols used for the synthesis of the alkyd resins are preferably aliphatic, cycloaliphatic and/or araliphatic alcohols having 1 to 6, preferably 1 to 4, OH groups attached to non-aromatic carbon atoms and containing 1 to 24 carbon atoms per molecule, e.g. glycols such as ethylene, glycol, propylene glycol, butanediols, neopentylglycol, ether alcohols such as diethylene and triethylene glycols or bis-(trimethylolpropane); trihydric and higher hydric alcohols such as glycerol, trimethylolethane and trimethylolpropane, pentaerythritol, dipentaerythritol and tripentaerythritol; sugar alcohols such as mannitol and sorbitol, and monohydric chain-breaking alcohols such as propanol, butanol, cyclohexanol and benzyl alcohol. The choice of alcohol components depends inter alia on the required free hydroxyl group content in the alkyd resin, the quantity of monocarboxylic acids used and the required criteria such as the solubility of the alkyd resins and the extent to which they can be diluted. The most preferred polyhydric alcohol is pentaerythritol.

The preferred acid components for the preparation of the alkyd resins are aliphatic, cycloaliphatic and/or aromatic polybasic carboxylic acids, preferbly, di-, tri- and tetracarboxylic acids containing 4 to 12 C-atoms per molecule or their esterifiable derivatives (e.g. anhydrides or esters), e.g. phthalic acid anhydride, iso- and terephthalic acid, tetra- and hexahydrophthalic acid anhydride, trimellitic acid anhydride, pyromellitic acid anhydride, maleic acid anhydride, adipic acid and succinic acid anhydride, and the higher and lower homologues and the alkyl-substituted derivatives of adipic acid.

Isophthalic acid or phthalic acid anhydride are most preferably used.

Suitable methods are known for the preparation of the fatty acid mixtures used as starting materials for the alkyd resins according to the invention, for example, the catalytic isomerisation of natural fatty acid mixtures, optionally in the form of their methyl esters.

The fatty acid mixtures are advantageously chosen so that, taking into account the degree of isomerisation obtainable, they already contain, prior to isomerisation, the proportion of simple unsaturated and saturated carboxylic acids required for the preparation of the alkyd resins according to the invention. The preferred fatty acid mixtures are those which can be obtained from soya bean oil, sunflower oil, safflower oil, ground nut oil, cotton seed oil, rape seed oil, corn oil and olive oil as well as certain, possibly pretreated, animal oils and fats.

In some cases, the corresponding conjugated oils may be used in place of the conjugated fatty acids.

Fatty acid mixtures which can be prepared by the dehydration of castor oil fatty acids, optionally in combination with isomerisation, distillation or other working up processes, are also preferred starting materials for the preparation of the alkyd resins according to the invention. Depending on the composition of the fatty acid mixtures, it may also be necessary to add other fatty acid mixtures (possibly also including mixtures not containing any conjugated fatty acids) or purely synthetic fatty acids such as α-ethylhexanoic acid or isononanoic acid in order to obtain the required composition according to the invention.

The fatty acid contents of the alkyd resins depend on the envisaged field of application. For very quick drying coatings it is preferred to use fatty acid contents of from 20 to 40%, whereas for exceptionally well levelling coatings the fatty acid contents may be from 40 to 60%.

Saturated fatty acids such as coconut fatty acids may also be used in addition to the drying fatty acids. Preferred aromatic carboxylic acids which may be used in quantities of 5 to 15% by weight, based on the alkyd resin after semi-ester formation, in order to increase the hardness, include benzoic acid, alkyl-benzoic acids containing 1 to 4 C-atoms per alkyl group, e.g. p-tert.-butylbenzoic acid, chlorobenzoic acids and hexahydrobenzoic acid.

The alkyd resin semi-esters may be prepared by the conventional method of reacting the hydroxyl-containing alkyd resin with the dicarboxylic acid anhydride at an elevated temperature, preferably at 100° to 160° C., until the acid number indicates the completion of semi-ester formation. Before semi-ester formation, the alkyd resins generally have acid numbers below 20, preferably below 10, and hydroxyl numbers ranging from 50 to 250. Alkyd resin semi-esters, on the other hand, generally have acid numbers of 30 to 70, preferably 35 to 50. The molecular weight of the unneutralised alkyd resin semi-ester, determined as the number average $\overline{M}_n$, is 200 to 10,000 (determined by vapour pressure osmometry up to molecular weights of 5000 and membrane osmometry at molecular weights above 5000, in each case on solutions in xylene). For the preparation of aqueous solutions, the alkyd resin semi-esters may first be dissolved in water-miscible organic solubilizing agents such as ethylene glycol monoalkyl ethers, e.g. ethylene glycol monomethyl, monoethyl or monobutyl ether, or in alcohols, esters, ketones, ketoalcohols or lower esters. The proportion of solubilizing agent, based on the finished lacquer, is in most cases 5 to 30% by weight but in some cases, the solubilizing agent may be dispensed with altogether. The water content, based on the sum of solubilizing agent+water in the finished lacquer, is generally from 50 to 95% by weight.

Preferred neutralising agents include ammonia, primary, secondary and tertiary amines such as ethylamine, di- and triethylamine, mono-, di- and triethanolamine, dimethyl ethanolamine and dimethylaminopropanol. The quantity of amines depends on the acid number. At low acid numbers, the degree of neutralisation should be 100%; at higher acid numbers, sufficient water-solubility may in many cases be obtained with a degree of neutralisation of only 70 to 90%.

The usual auxiliary agents, siccatives, fillers, pigments, etc. may be used for preparing the lacquers. It is advisable to add antiskinning agents to the products ready for delivery.

Other resins, such as melamine resins or other crosslinking aminoplasts (see French Pat. No. 943,411; D. H. Solomon, The Chemistry of Organic Filmformers, 235–240, John Wiley & Sons, Inc. New York 1967; "Methoden der Organischen Chemie" (Houben-Weyl), Vol. 14/2, part 2, 4th Edition, Georg Thieme Verlag, Stuttgart 1963, pages 319 et seq) may also be added. In that case, the lacquers obtained dry oxidatively when briefly heated and are at the same time cross-linked by the aminoplastic resin.

The invention also provides a process for the preparation of water-soluble, air-drying, amine-neutralised alkyd resins having fatty acid contents of from 20 to 60%, characterised in that an alkyd resin having an acid number below 20 and a hydroxyl number of from 50 to 250 obtained from dicarboxylic acids or their esterforming derivatives, polyhydric alcohols an fatty acids, from 10 to 80% by weight of which fatty acids contain conjugated double bonds, is reacted with hexahydrophthalic acid anhydride at an elevated temperature, preferably at 100° to 160° C., until an acid number of from 30 to 70 is obtained, and the resulting semi-ester is optionally dissolved in a solubilizing agent and is at least partially neutralised with ammonia or amines.

The invention further relates to the use of these neutralised alkyd resin semi-esters as a basis for aqueous non-yellowing lacquers. These are particularly advantageous for use in situations where the lacquer coats are exposed to ageing by heat, e.g. on heating elements such as radiators and radiator pipes.

Particularly preferred alkyd resins according to the invention are those which contain pentaerythritol groups as their polyhydric alcohol moiety, isophthalic acid or phthalic acid groups as their dicarboxylic acid moiety, while as their conjugated fatty acid moiety they contain conjugated soya oil fatty acid groups comprising 29–33% by weight, preferably about 31% by weight of oleic acid, 46–55% by weight, preferably about 51% by weight of linoleic acid and 8–12% by weight, preferably about 10% by weight of linolenic acid, 42–48% of the linoleic acid and linolenic acids being conjugated, and these preferred alkyd resins have fatty acid contents of 32–38% by weight and contain 10–14% by weight of condensed benzoic acids, and, as unneutralized semi-esters, they have acid numbers of the semi-ester of 38–44 and hydroxyl numbers of 70 to 100.

The parts given in the following Examples are parts by weight; percentages denote percentages by weight.

EXAMPLE 1

An alkyd resin having an acid number of 5.5 and a viscosity corresponding to an outflow time of 33 seconds (determined on a 60% solution in dimethylformamide in a DIN 4 cup according to DIN 53 211) is prepared from 1360 parts of pentaerythritol, 1808 parts of a conjugated soya bean fatty acid in which the diunsaturated and polyunsaturated fatty acid contents have a degree of conjugation of 51%, 427 parts of benzoic acid and 1078 parts of isophthalic acid under a nitrogen atmosphere at 220° C. 3463 Parts of this alkyd resin are reacted with 638 parts of hexahydrophthalic acid anhydride and converted at 140° C. to the alkyd resin semi-ester having an acid number of 41 and a viscosity corresponding to an outflow time of 145 seconds (DIN 53 211, DIN cup 4, 50% in dimethylformamide). This alkyd resin, which has a fatty acid content of 36%, a benzoic acid content of 8.5% and a hydroxyl number of 150 is dissolved in ethylene glycol monoethyl ether to form a 63% solution.

This solution is used to prepare an aqueous lacquer which is prepared for delivery by adjustment to 60% concentration with an additional quantity of ethylene glycol monoethyl ether and neutralisation of the acid groups with triethylamine. The lacquer formulation for this and the following Examples have the following composition:

| Alkyd resin, 60%, neutralised | 31.00% by weight |
|---|---|
| Titanium dioxide, rutile type | 17.50 |
| Cobalt siccative, 6% liquid | 0.10 |
| Antiskinning agent, oximic | 0.30 |
| Water, deionised | 51.10 |
| | 100.00% by weight |

The drying time of this white lacquer until it is free from tackiness is one hour. After 24 hours, the lacquer is completely dry right through and has a pendulum hardness of 32 seconds (according to König), a gloss (according to Gardner, 20° measuring angle) of 80, an initial whiteness degree (according to Berger) of 84.2, and after 5 days' storage at 50° C. it still has a degree of whiteness of 71.6, while after 17 hours at 130° C. it still has a white tone value of 45.3 and a gloss (according to Gardner 20° measuring angle) of 50, and its water resistance values (according to DIN 53 209) of m 4/g 2 are equally good.

The following Example provides a comparison and shows the surprising lacquer technical advantages of the alkyd resins according to the invention compared with binders which do not conform to the combination according to the invention but which have been prepared by the method indicated in Example 1, the raw materials according to the invention having been replaced by equivalent proportions of raw materials not according to the invention.

EXAMPLE 2

An alkyd resin corresponding to that of Example 1 but prepared from 1214 parts of phthalic acid anhydride instead of isophthalic acid and reacted as in Example 1 with hexahydrophthalic acid anhydride has an acid number of 43 and a viscosity corresponding to an outflow time of 173 seconds (50% in dimethylformamide, DIN 53 211, DIN cup 4).

COMPARISON EXPERIMENTS (a) with natural soya oil fatty acid instead of conjugated soya oil fatty acid
(b) with tetrahydrophthalic acid anhydride instead of hexahydrophthalic acid anhydride
(c) with phthalic acid anhydride instead of hexahydrophthalic acid anhydride
(d) with succinic acid anhydride instead of hexahydrophthalic acid anhydride
(e) with maleic acid anhydride instead of hexahydrophthalic acid anhydride.

Comparison (e) was not tested for its lacquer technical qualities because severe gel formation set in during preparation of the lacquer.

The following Table gives a summary of the lacquer technical advantages of the systems according to the invention.

| | (a) | (b) | (c) |
|---|---|---|---|
| AN, 100% resin | 40.2 | 43.1 | 47.7 |
| Viscosity DF. [cP] | 8673 | 7553 | 9694 |
| Neutralised with | TEA | TEA | TEA |
| pH | 9.75 | 9.55 | 8.95 |
| Dust dry at 20° C./42% | | | |
| AM after (h) | ½ | ½ | ½ |
| Tack free at 20° C./42% | | | |
| AM after (h) | 1¼ | 1¼ | 1¼ |
| Gloss (Gardner 20°) initially; 5 days/50° C.; 17 h/130° C. | 83-81-43 | 80-77-56 | 80-67-28 |
| Complete drying after 24 h/RT | 0 | 0 | 0 |
| Pendulum hardness after 24/48/72 h 35–40 μ [sec] | 38/43.5/50 | 34/47.5/54 | 34/51/61 |
| Degree of whiteness initially/after 17 h at 130° C. | 79.3–22.3 | 81.0–27.6 | 81.2–38.6 |
| Degree of whiteness after 5 days at 50° C. | 62.7 | 71.3 | 69.9 |
| Elasticity after one week at 70° C. [mm] | 8.2 | 8.2 | 8.7 |
| Viscosity [sec]; dilution [% H₂O] | 44/14.07 | 44/13.57 | n.m/30 |

| | (d) | Example 2 |
|---|---|---|
| AN, 100% resin | 43.7 | 43.8 |
| Viscosity DF. [cP] | 6580 | 8674 |
| Neutralised with | TEA | TEA |
| pH | 8.95 | 9.55 |
| Dust dry at 20° C./42% | | |
| AM after (h) | ½ | ½ |
| Tack free at 20° C./42% | | |
| AM after (h) | 1¼ | 1¼ |
| Gloss (Gardner 20°) initially; 5 days/50° C.; 17 h/130° C. | 81-76-53 | 80-76-36 |
| Complete drying after 24 h/RT | 0 | 0 |
| Pendulum hardness after 24/48/72 35–40 μ [sec] | 19/29/37 | 31/49.5/68 |
| Degree of whiteness initially/after 17 h at 130° C. | 82.3–32.5 | 82.0–35.5 |
| Degree of whiteness after 5 days at 50° C. | 66.4 | 69.5 |
| Elasticity after one week at 70° C. [mm] | >10 | 8.8 |
| Viscosity [sec]; dilution [% H₂O] | 44/11.15 | 43 13.04 |

Abbreviations:
AN = acid number
DF = delivery form
TEA = triethylamine
AM = atmospheric moisture
RT = room temperature
n.m = no measurable
Visc. = viscosity Since, when assessing lacquer costs, it is frequently not possible to consider a single property on its own, the following Table shows the differences between a conventional system and the systems according to the invention:

O = equivalent to the system according to the invention;
+ = better than the system according to the invention;
− = inferior to the system according to the invention.

| | (a) | (b) | (c) | (d) | Example 2 |
|---|---|---|---|---|---|
| Drying characteristics | 0 | 0 | 0 | 0 | 0 |
| Hardness | − | − | 0 | − | 0 |
| Gloss | 0 | 0 | 0 | 0 | 0 |
| Gloss retention 5 days at 50° C. | + | 0 | − | 0 | 0 |
| Gloss retention 17 hours at 130° C. | + | + | − | + | 0 |
| White tone | − | 0 | 0 | 0 | 0 |
| Retention of white tone | | | | | |

-continued

|  | (a) | (b) | (c) | (d) | Example 2 |
|---|---|---|---|---|---|
| 5 days at 50° C. Retention of white tone | — | + | 0 | — | 0 |
| 17 hours at 130° C. | — | — | + | — | 0 |
| Water resistance | + | — | — | — | 0 |
| Ability to be diluted with water | 0 | — | — | (+) | 0 |
| Stability in storage of the delivery form after 1 month's storage at room temperature | 0 | — | — | 0 | 0 |

We claim:

1. Water-soluble, air-drying, amine-neutralised alkyd resins having fatty acid contents of 20-60% obtained from reactants comprising dicarboxylic acids or their ester-forming derivatives, polyhydric alcohols, fatty acids, and semi-ester-forming dicarboxylic acid anhydrides, characterised in that 10-80% by weight of the fatty acids are fatty acids with conjugated double bonds and the semi-ester-forming dicarboxylic acid anhydride is hexahydrophthalic acid anhydride.

2. Alkyd resins according to claim 1, characterised in that 25-40% by weight of the fatty acids consists of fatty acids with conjugated double bonds.

3. Alkyd resins according to claim 1 or 2, characterised in that the dicarboxylic acids or their ester-forming derivatives are isophthalic acid or phthalic acid anhydride.

4. Alkyd resins according to claim 1, characterised in that the polyhydric alcohol is pentaerythritol.

5. Alkyd resins according to claim 1, characterised in that the fatty acid with conjugated double bonds is conjugated soya oil fatty acid containing 29-33% by weight of oleic acid, 46-55% by weight of linoleic acids and 8-12% by weight of linolenic acids, 42-48% of the linoleic and linolenic acids being conjugated.

6. Alkyd resins according to claim 1, characterised in that they have fatty acid contents of 32-38%.

7. Alkyd resins according to claim 1, characterised in that they contain 10-14% by weight of condensed benzoic acids.

8. Alkyd resins according to claim 1, characterised in that, as unneutralised semi-esters, they have acid numbers of 38-44 and hydroxyl numbers of 70-100.

9. A process for the preparation of alkyd resins according to claim 1, characterised in that an alkyd resin having acid numbers below 20 and hydroxyl numbers from 50-250 obtained from dicarboxylic acids or their ester-forming derivatives, polyhydric alcohols and fatty acids, 10-80% by weight of which fatty acids have conjugated double bonds, is reacted with hexahydrophthalic acid anhydride at an elevated temperature, preferably at 100°-160° C., until an acid number of 30-70 is reached, and the resulting semi-ester is at least partially neutralised with ammonia or amines.

10. The use of the alkyd resins according to claim 1 as a basis for aqueous non-yellowing lacquers.

11. Alkyd resins according to claim 1 wherein said reactants include monocarboxylic acid, monohydric alcohol or mixtures thereof.

12. The process for the preparation of alkyd resins according to claim 9 wherein said resulting semi-ester is predissolved in a solubilizable agent before being at least partially neutralized.

* * * * *

UNITED STATES PATENT AND TRADEMARK OFFICE
CERTIFICATE OF CORRECTION

PATENT NO. : 4,346,044
DATED : AUGUST 24, 1982
INVENTOR(S) : ROLF DHEIN ET AL

It is certified that error appears in the above-identified patent and that said Letters Patent is hereby corrected as shown below:

Col. 1, line 59, "35" should read --25--.

Signed and Sealed this

Eleventh Day of January 1983

[SEAL]

Attest:

GERALD J MOSSINGHOFF

Attesting Officer

Commissioner of Patents and Trademarks